United States Patent
Lin

(10) Patent No.: US 11,302,195 B2
(45) Date of Patent: Apr. 12, 2022

(54) TRAFFIC SERVICE OBTAINING METHOD AND RELATED DEVICE

(71) Applicant: HUAWEI TECHNOLOGIES CO., LTD., Guangdong (CN)

(72) Inventor: Yangbo Lin, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 222 days.

(21) Appl. No.: 16/164,320

(22) Filed: Oct. 18, 2018

(65) Prior Publication Data

US 2019/0051181 A1    Feb. 14, 2019

Related U.S. Application Data

(63) Continuation of application No. PCT/CN2016/079615, filed on Apr. 19, 2016.

(51) Int. Cl.
*G08G 1/16* (2006.01)
*H04L 29/08* (2006.01)
(Continued)

(52) U.S. Cl.
CPC ........... *G08G 1/164* (2013.01); *G08G 1/0145* (2013.01); *G08G 1/166* (2013.01); *G08G 1/20* (2013.01); *H04L 29/08* (2013.01); *H04L 67/12* (2013.01)

(58) Field of Classification Search
CPC ........ G08G 1/164; G08G 1/145; G08G 1/166; G08G 1/20; G08G 1/116; G08G 1/09;
(Continued)

(56) References Cited

U.S. PATENT DOCUMENTS 5,375,059 A  *  12/1994  Kyrtsos .................. G01S 19/47
                                                             701/470
2006/0116122 A1  6/2006  Verma et al.
(Continued)

FOREIGN PATENT DOCUMENTS

CN           1672393 A        9/2005
CN         102752367 A       10/2012
(Continued)

OTHER PUBLICATIONS

JP2012089088 Probe Information System and Probe Information Processing Method, May 2012 (Year: 2012).*
(Continued)

*Primary Examiner* — Jess Whittington
*Assistant Examiner* — Terry C Buse
(74) *Attorney, Agent, or Firm* — Conley Rose, P.C.

(57) ABSTRACT

Embodiments of the present invention provide a traffic service obtaining method comprises: receiving a registration request sent by a first vehicle; allocating a temporary identifier to the first vehicle based on the registration request, where the temporary identifier is used to identify the first vehicle in coverage of a transport system; receiving a request message that is sent by a second vehicle and that is used to request a target traffic service; determining a first vehicle related to the target traffic service, and determining, based on a table of a correspondence, target status information required for the target traffic service; obtaining the target status information from the first vehicle, where the target status information carries the temporary identifier; and sending the target status information to the second vehicle, where the target status information is used to provide the second vehicle with the target traffic service.

20 Claims, 8 Drawing Sheets

(51) Int. Cl.
*G08G 1/01* (2006.01)
*G08G 1/00* (2006.01)
*H04L 65/40* (2022.01)
*H04L 67/12* (2022.01)

(58) Field of Classification Search
CPC .. G08G 1/87; G08G 1/00; G08G 1/13; G08G 1/18; H04L 29/08; H04L 67/12; H04L 12/28; H04L 12/04; H04B 7/26; G06F 13/00; G06F 17/60; H04Q 7/38; B60K 28/10; B80R 21/00; B80R 25/00; B60R 25/10; G08B 25/10; H04W 4/04
USPC .......................................................... 701/117
See application file for complete search history.

(56) References Cited

U.S. PATENT DOCUMENTS

| | | | |
|---|---|---|---|
| 2006/0221918 A1* | 10/2006 | Wang ...................... | H04W 4/02 370/338 |
| 2009/0150017 A1* | 6/2009 | Caminiti ................ | G07C 5/008 701/23 |
| 2011/0119132 A1 | 5/2011 | Morton et al. | |
| 2011/0156924 A1* | 6/2011 | Nadeem ............... | G08G 1/0104 340/905 |
| 2013/0117389 A1 | 5/2013 | Yamada et al. | |
| 2014/0161240 A1 | 6/2014 | Chau et al. | |
| 2014/0297110 A1* | 10/2014 | Noda ................. | H04B 7/15507 701/36 |
| 2014/0309815 A1* | 10/2014 | Ricci ................ | G08B 13/19647 701/2 |
| 2015/0120181 A1 | 4/2015 | Pühler et al. | |
| 2015/0151755 A1* | 6/2015 | Ohmori .................... | B60T 7/22 701/93 |
| 2015/0282210 A1* | 10/2015 | Li ........................ | H04W 76/14 455/436 |

FOREIGN PATENT DOCUMENTS

| | | |
|---|---|---|
| CN | 103686740 A | 3/2014 |
| CN | 103886738 A | 6/2014 |
| CN | 105050069 A | 11/2015 |
| JP | H10209954 A | 8/1998 |
| JP | 2001313979 A | 11/2001 |
| JP | 2002274305 A | 9/2002 |
| JP | 2003097968 A | 4/2003 |
| JP | 2012089088 A | 5/2012 |
| JP | 2013097690 A | 5/2013 |
| JP | 2013245991 A | 12/2013 |
| JP | 2014195143 A | 10/2014 |
| WO | 2015151250 A1 | 10/2015 |

OTHER PUBLICATIONS

JP2001313979 Method for Connecting Mobile Terminal, Nov. 2001 (Year: 2001).*
EP2590118 Posted Message Providing System, Apparatus, Method, and Computer Program, Oct. 2012 (Year: 2012).*
JP2013245991 Terminal Apparatus, Control Method, Program, and Recording Medium, Dec. 2013 (Year: 2013).*
CN105050069 network monitoring method for smart cars and smart cars with claims, Feb. 2015 (Year: 2015).*
International Search Report, dated Jan. 12, 2017, in International Application No. PCT/CN2016/079615 (4 pp.).
Extended European Search Report, dated Feb. 14, 2019, in European Application No. 16898923.4 (8 pp.).
Machine Translation and Abstract of Japanese Publication No. JP2001313979, Nov. 9, 2001, 31 pages.
Machine Translation and Abstract of Japanese Publication No. JP2002274305, Sep. 25, 2002, 28 pages.
Machine Translation and Abstract of Japanese Publication No. JP2003097968, Apr. 3, 2003, 15 pages.
Machine Translation and Abstract of Japanese Publication No. JP2012089088, May 10, 2012, 45 pages.
Machine Translation and Abstract of Japanese Publication No. JP2013245991, Dec. 9, 2013, 30 pages.
Machine Translation and Abstract of Japanese Publication No. JPH10209954, Aug. 7, 1998, 13 pages.
Machine Translation and Abstract of International Publication No. WO2015151250, Oct. 8, 2015, 36 pages.
Foreign Communication From A Counterpart Application, Japanese Application No. 2018-554692, Japanese Office Action dated Dec. 2, 2019, 3 pages.
Foreign Communication From A Counterpart Application, Japanese Application No. 2018-554692, English Translation of Japanese Office Action dated Dec. 2, 2019, 4 pages.
Written Opinion of the International Searching Authority, dated Jan. 12, 2017, in International Application No. PCT/CN2016/079615 (7 pp.).

* cited by examiner

TRAFFIC SERVICE OBTAINING METHOD AND RELATED DEVICE

CROSS-REFERENCE TO RELATED APPLICATIONS

This application is a continuation of International Application No. PCT/CN2016/079615, filed on Apr. 19, 2016, the disclosure of which is hereby incorporated by reference in its entirety.

TECHNICAL FIELD

The present disclosure relates to the communications field, and in particular, to a traffic service obtaining method and a related device.

BACKGROUND

Accompanying with social progress and rapid economic development, a city scale, population, and motor vehicle population are dramatically increased. As a result, problems such as traffic congestion, environmental pollution, and traffic safety become increasingly serious. An information-based and intelligent traffic control technology, represented by an Intelligent Transport System (ITS), emerges, to effectively improve a safety operation capability and a comprehensive service level in traffic operation. Based on a current existing information technology, communications technology, control technology, sensing technology, and the like, the ITS can be effectively applied and integrated into a transport system, to establish a traffic information system that is useful, real-time, accurate, and timely in a wide range of the ITS.

Traffic information may be divided into static status information and dynamic status information based on a change frequency of the traffic information. Road traffic information that is stable in a period of time is referred to as the static status information, and mainly includes road network information, motor vehicle population information, driver information, and the like. Information that continuously changes in time and space is referred to as the dynamic status information. For example, for a vehicle, dynamic status information includes a speed, time headway, a traveling time, and the like. Static status information and dynamic status information of urban road traffic are collected, to provide a basis for a traffic service required by the vehicle. When the vehicle participates in a traffic activity in a transport system, vehicle status information needs to be used. Therefore, it is likely to leak private status information related to the vehicle, such as driver information and historical traveling information, and information security is under threat.

SUMMARY

Embodiments of the present invention provide a traffic service obtaining method and a related device, to prevent leakage of private status information related to a vehicle and ensure information security.

An embodiment of the present invention provides a traffic service obtaining method. The method may be applied to a transport system. For example, the transport system may be an Intelligent Transport System (English: Intelligent Transport System, ITS for short). The ITS may be configured to: obtain, process, and use information in real time, and accurately provide a user with a traffic service in time. The transport system includes a management center and vehicles. The vehicles may include a first vehicle and a second vehicle. The second vehicle may be a vehicle that needs to obtain a traffic service, and the traffic service may be understood as a service provided by the transport system for the vehicle. The first vehicle may be a vehicle that provides the second vehicle with status information.

According to a first aspect, an embodiment of the present invention provides a traffic service obtaining method, where the method is applied to a transport system; a management center receives a registration request sent by a first vehicle; and the management center allocates a temporary identifier to the first vehicle based on the registration request, where the temporary identifier is used to identify the first vehicle in coverage of the transport system. A transport system includes a plurality of vehicles. A service may be related to a plurality of vehicles. For example, collision and congestion each are mutual. Therefore, when a second vehicle expects to obtain a traffic service, the second vehicle needs to get help from another vehicle related to the traffic service. In other words, the second vehicle may need to obtain status information of the another vehicle, to implement the traffic service. When the second vehicle needs to obtain a traffic service, the second vehicle may send, to the management center, a request message used to request a target traffic service. After receiving the request message, the management center determines which vehicles are related to the target traffic service. These vehicles related to the target traffic service may be first vehicles. An anti-collision service is used as an example. First vehicles are all vehicles in a preset range surrounding the second vehicle. The management center may further determine, based on a stored table of a correspondence between a traffic service and status information, target status information required for the target traffic service. The management center obtains the target status information of the first vehicle, where the target status information carries the temporary identifier of the first vehicle. Then, the management center forwards the target status information to the second vehicle. The second vehicle obtains the target traffic service based on status information of the first vehicle.

In this embodiment of the present invention, the management center determines, based on the stored table of a correspondence between a traffic service and status information, the target status information corresponding to the target traffic service, and obtains the target status information from the first vehicle (a status information provider); the first vehicle provides the target status information based on the specific target traffic service. The target status information carries the temporary identifier of the first vehicle. When being used to perform a function of identifying the vehicle, the temporary identifier is not associated with private status information (such as driver information or historical data information) of the first vehicle. This effectively prevents leakage of private information of the first vehicle (the information provider), and improves information security.

Optionally, the registration request carries a permanent identifier, the permanent identifier is a unique identifier that keeps unchanged in a life cycle of the first vehicle, and before the allocating, by the management center, a temporary identifier to the first vehicle based on the registration request, the method may further include: querying, by the management center, the status information of the first vehicle based on the permanent identifier; and when the status information of the first vehicle meets a preset criterion, where the preset criterion may be, for example, that a service life is less than a first threshold and a swept volume is less than a second threshold, determining, by the management center, to allow the first vehicle to be registered with the transport system.

In this embodiment of the present invention, whether a vehicle is a legal vehicle is determined by using a permanent identifier carried in the registration request; and only when it is determined that the vehicle is the legal vehicle, the vehicle is allowed to enter the ITS; or when it is determined that the vehicle is an illegal vehicle, information about the vehicle is reported to a traffic management department. This effectively reduces a potential road traffic hazard and improves vehicle traveling safety. An illegal vehicle is monitored, effectively reducing an accident occurrence possibility of the illegal vehicle on a road.

Optionally, the transport system further includes a querying device; the management center associatively stores the permanent identifier, the temporary identifier, and status information associated with the temporary identifier; the management center receives a query request from the querying device, where the query request carries the permanent identifier and/or the temporary identifier; then, the management center determines whether the querying device has a query permission; and when the management center determines that the querying device has the query permission, the management center provides the querying device with the status information associated with the temporary identifier.

In this embodiment of the present invention, in different ITSs, different temporary identifiers may be allocated to a same vehicle. Historical traffic data of the vehicle may be found by associatively storing a unique permanent identifier and the temporary identifiers. However, not all departments or persons can query the historical data. A department having a right can find the historical data. Therefore, accurate and effective evidence may be provided for a judicial branch in some special cases.

Optionally, the management center receives a deregistration request sent by the first vehicle, where the deregistration request carries the temporary identifier and/or the permanent identifier; and the management center disassociates the permanent identifier from the temporary identifier based on the temporary identifier and/or the permanent identifier, and releases the temporary identifier.

Optionally, the traffic service includes an anti-collision service, a path planning service, or a road congestion predetermining service.

Optionally, a correspondence in the table of a correspondence includes: when the target traffic service is the anti-collision service, target status information corresponding to the anti-collision service is specifically information about load, a direction, a speed, and braking; when the target traffic service is the path planning service, target status information corresponding to the path planning service is specifically a real-time position, a starting position, an end position, and a speed; or when the target traffic service is the road congestion predetermining service, target status information corresponding to the road congestion predetermining service is specifically a real-time position, an end position, a direction, and a speed.

According to a second aspect, an embodiment of the present invention provides a computer storage medium, configured to store a computer software instruction used in the method of the first aspect. The computer software instruction includes a program designed for performing the foregoing aspect.

According to a third aspect, an embodiment of the present invention provides a management center that has a function actually performed by a management center for implementing the foregoing method. The function may be implemented by hardware, or may be implemented by hardware by executing corresponding software. The hardware or the software includes one or more modules corresponding to the function.

According to a fourth aspect, a structure of a management center includes a memory, a transceiver, and a processor. The memory is configured to: store computer-executable program code, and be coupled to the transceiver. The program code includes an instruction. When the processor executes the instruction, the management center processes, based on the instruction, information or an instruction used in the foregoing method.

According to a fifth aspect, an embodiment of the present invention provides a traffic service obtaining method, where the method is applied to a transport system, the transport system includes a management center, a first vehicle, and a second vehicle, and the first vehicle stores a table of a correspondence between a traffic service and status information. When the first vehicle is registered with the transport system, the first vehicle receives a temporary identifier sent by the management center, where the temporary identifier is used to identify the first vehicle in coverage of the transport system; the first vehicle receives an indication message, sent by the management center, of a target traffic service; the first vehicle determines, based on the indication message and the table of a correspondence, target status information corresponding to the target traffic service; and then, the first vehicle sends the target status information to the management center, where the target status information carries the temporary identifier of the first vehicle, and the target status information is used to provide the second vehicle with the target traffic service.

In this embodiment of the present invention, the first vehicle determines, based on the indication message and the stored table of a correspondence between a traffic service and status information, the target status information that needs to be provided, where the target status information carries the temporary identifier of the first vehicle; and the first vehicle provides the target status information based on the specific target traffic service. When being used to perform a function of identifying the vehicle, the temporary identifier is not associated with other private information (such as driver information or historical data information) of the first vehicle. This effectively prevents leakage of private information of the first vehicle (an information provider), and improves information security.

Optionally, the first vehicle sends a registration request to the management center. The registration request carries a permanent identifier. The permanent identifier is a unique identifier that keeps unchanged in a life cycle of the first vehicle, and the permanent identifier is used to instruct the management center to query status information of the first vehicle and determine, based on the status information of the first vehicle, to allocate the temporary identifier to the first vehicle.

In this embodiment of the present invention, whether a vehicle is a legal vehicle is determined by using a permanent identifier carried in the registration request; and only when it is determined that the vehicle is the legal vehicle, a temporary identifier is allocated to the vehicle; or when it is determined that the vehicle is an illegal vehicle, information about the vehicle is reported to a traffic management department. This effectively reduces a potential road traffic hazard and improves vehicle traveling safety. An illegal vehicle is monitored, effectively reducing an accident occurrence possibility of the illegal vehicle on a road.

Optionally, the traffic service includes an anti-collision service, a path planning service, or a road congestion predetermining service.

Optionally, a correspondence in the table of a correspondence includes: when the target traffic service is the anti-collision service, target status information corresponding to the anti-collision service is specifically information about load, a direction, a speed, and braking; when the target traffic service is the path planning service, target status information corresponding to the path planning service is specifically a real-time position, a starting position, an end position, and a speed; or when the target traffic service is the road congestion predetermining service, target status information corresponding to the road congestion predetermining service is specifically a real-time position, an end position, a direction, and a speed.

According to a sixth aspect, an embodiment of the present invention provides a computer storage medium, configured to store a computer software instruction used in the method of the fifth aspect. The computer software instruction includes a program designed for performing the foregoing aspect.

According to a seventh aspect, an embodiment of the present invention provides a vehicular device that has a function actually performed by a first vehicle for implementing the foregoing method. The function may be implemented by hardware, or may be implemented by hardware by executing corresponding software. The hardware or the software includes one or more modules corresponding to the function.

According to an eighth aspect, a structure of a vehicular device includes a memory, a transceiver, and a processor. The memory is configured to: store computer-executable program code, and be coupled to the transceiver. The program code includes an instruction. When the processor executes the instruction, the vehicular device processes, based on the instruction, information or an instruction used in the method of the fifth aspect.

According to a ninth aspect, an embodiment of the present invention provides a transport system, where the transport system includes a management center, a first vehicle, and a second vehicle. The management center is the management center provided in the third aspect or the fourth aspect. Alternatively, the first vehicle is a vehicle provided in the seventh aspect or the eighth aspect.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person skilled in the art based on the embodiments of the present invention without creative efforts shall fall within the protection scope of the present invention.

In the specification, claims, and accompanying drawings of the present invention, the terms "first", "second", "third", "fourth", and the like (if any) are intended to distinguish between similar objects but do not necessarily indicate a specific order or sequence. It should be understood that the data termed in such a way are interchangeable in proper circumstances so that the embodiments described herein can be implemented in other orders than the order illustrated or described herein. Moreover, the terms "include", "have" and any other variants mean to cover the non-exclusive inclusion, for example, a process, method, system, product, or device that includes a list of steps or units is not necessarily limited to those listed steps or units, but may include other steps or units not expressly listed or inherent to such a process, method, product, or device.

Figure 1:
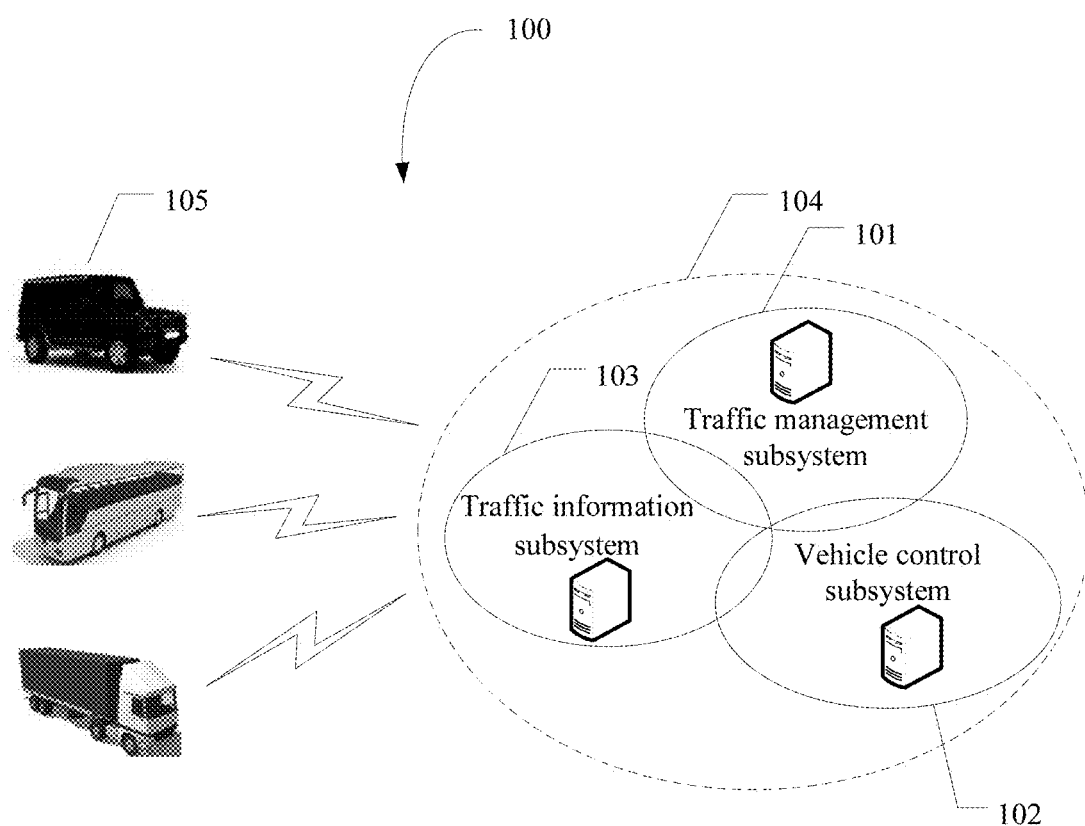
FIG. 1 is a schematic network architectural diagram of a transport system according to an embodiment of the present invention.

An embodiment of the present invention provides a traffic service obtaining method. The method may be applied to a transport system. For example, the transport system may be an Intelligent Transport System (English: Intelligent Transport System, ITS for short). The ITS may be configured to: obtain, process, and use information in real time, and accurately provide a user with a traffic service in time. The transport system includes a management center 104, a vehicle 105, a pedestrian, a road traffic facility, and the like. In this embodiment of the present invention, core participants of the transport system, the management center 104 and the vehicle 105, are described. For example, referring to FIG. 1, FIG. 1 is a schematic network architectural diagram of a transport system 100. The transport system may include a management center 104 and a vehicle 105. The management center 104 may further include a traffic management subsystem 101, a vehicle control subsystem 102, and a traffic information subsystem 103. The vehicle control subsystem 101 is responsible for controlling traveling of a vehicle safely and efficiently. The traffic information subsystem 103 is responsible for accurately collecting, processing, and exchanging information of traffic participants in time. The traffic management subsystem 102 is responsible for tracking traffic information, to coordinate and control behavior of the traffic participants. It may be understood that the management center may have an integrated host server. The host server exchanges information with the vehicle 105. Alternatively, each subsystem in the management center 104 includes an information management device, and the information management device implements a function of a subsystem to which the information management device belongs, and exchanges information with the vehicle 105. During actual application, a specific implementation is not limited in the present invention.

In this embodiment of the present invention, a vehicle carries out an activity in coverage of the transport system. The management center may allocate a temporary identifier to a vehicle that is registered with the transport system. The temporary identifier is used to identify the vehicle in the coverage of the transport system. The temporary identifier is temporarily allocated by the transport system when the vehicle is registered with the transport system. Therefore, when being used to perform a function of identifying the vehicle, the temporary identifier is not associated with other private status information of the vehicle, such as driver information and related historical information (a historical traveling path) of the vehicle. The foregoing status information is used as an example. For example, both the driver information and the related historical information of the vehicle may be considered as private information related to the vehicle. The information has relatively high sensitivity. For example, the driver information may include a name, an identity card number, and the like of a driver; and the related historical information includes a historical traveling record of the vehicle, to be specific, where the vehicle has gone, for example, a company address and a home address of the driver. Leakage of the information may give an opportunity to a lawbreaker. The temporary identifier is not associated with the high sensitive information. Therefore, the temporary identifier is used to identify the vehicle in the transport system. This can greatly improve security of the private information related to the vehicle. Vehicles in the transport system may include a first vehicle and a second vehicle. The second vehicle may be a vehicle that needs to obtain a traffic service. The traffic service in this embodiment of the present invention may be understood as a service, such as a path planning service or an anti-collision service, provided by the transport system for the vehicle. A transport system includes a plurality of vehicles. A service may be related to a plurality of vehicles. For example, collision and congestion each are mutual. Therefore, when the second vehicle expects to obtain a traffic service, the second vehicle needs to get help from another vehicle related to the traffic service. In other words, the second vehicle may need to obtain status information of the another vehicle, to implement the traffic service. When the second vehicle needs to obtain a traffic service, the second vehicle may send, to the management center, a request message used to request a target traffic service. After receiving the request message, the management center determines which vehicles are related to the target traffic service. These vehicles related to the target traffic service may be first vehicles. An anti-collision service is used as an example. First vehicles are all vehicles in a preset range surrounding the second vehicle. The management center may further determine, based on a stored table of a correspondence between a traffic service and status information, target status information required for the target traffic service. The management center obtains the target status information of the first vehicle, where the target status information carries a temporary identifier of the first vehicle. Then, the management center forwards the target status information to the second vehicle. The second vehicle obtains the target traffic service based on status information of the first vehicle.

For ease of understanding, the following briefly describes some of the above-mentioned terms.

Coverage of the transport system: In this embodiment of the present invention, the ITS may be divided by region. A division criterion may be that there is one Intelligent Transport System in a geographical range of one urban area, for example, in a geographical range of Shenzhen, China. Alternatively, one district may be a range of one ITS, for example, a geographical range of Bao'an district in Shenzhen, China is a range of one ITS. Alternatively, a geographical range of one city cluster may be a range of one ITS, for example, a geographical range of three cities in China, Dongguan, Shenzhen, and Huizhou, is a range of one ITS. In an actual specific implementation, a geographical range is not limited.

Temporary identifier: In this embodiment of the present invention, after a vehicle enters an ITS, the ITS allocates a temporary identifier to the vehicle, and feeds back the temporary identifier to the vehicle. The temporary identifier should be used to uniquely identify one vehicle in a range of the ITS, and therefore is planned and allocated by the ITS in a unified manner. When the vehicle carries out an activity or an event (for example, traveling once from a starting point to an end point) in the range of the ITS, the temporary identifier is associated with the vehicle, and keeps effective and unchanged in a process of the activity. Temporary identifiers of a same vehicle are usually different in different ITSs. However, the temporary identifiers may keep the same through coordination between the ITSs. In this case, these ITSs that can coordinate with each other need to plan and allocate the temporary identifiers in a unified manner, so that the temporary identifiers are generally used in an area less than a global scope but greater than a range of a single ITS. After the first vehicle receives a temporary identifier, the first vehicle may use the temporary identifier to represent the vehicle in participating in exchanging related status information in the ITS and obtaining a traffic service. The traffic service may be used to provide a driver with reference service information.

Status information includes static status information, and includes dynamic status information. The static status information is mainly information that is of the vehicle and that does not vary with time and space, for example, information such as a type, a production date, load, and a swept volume of the vehicle. The dynamic status information is mainly information that may vary with the time and the space, for example, information such as a speed, a direction, and braking information of the vehicle. The traffic service is obtained by processing the status information. Therefore, different traffic services require different status information, and the vehicle needs to provide the ITS or another surrounding vehicle with different status information based on different traffic services.

Each vehicle in coverage of the ITS may send some basic status information to the information management device in real time. The basic status information may be understood as some related information, such as a real-time geographical position and like information, used in a traveling process of the vehicle. Based on the basic status information, the information management device may monitor a traffic status in the ITS in real time.

Traffic services may be different based on different user requirements, such as an anti-collision service, a path planning service, and a road congestion predetermining service. For example, the anti-collision service is prompt information provided for a vehicle when a plurality of surrounding vehicles in a preset range may collide with the vehicle, and the vehicle may avoid the collision based on the provided information. The path planning service is a service of providing a vehicle with an optimal path from a starting point to an end point, and is mainly a service that the ITS provides a plurality of paths for a user based on real-time road status information learned by the ITS and provides an optimal path (for example, no congestion). The road congestion predetermining service refers to a probability that congestion may occur on a critical road segment in a time period when a vehicle travels from a starting point to an end point.

A correspondence between a traffic service and status information exists, and is described by using the following Table 1 as an example:

TABLE 1

| Traffic service | Status information |
| --- | --- |
| Anti-collision service | Load, a direction, a speed, and braking information |
| Path planning service | Real-time position, a starting position, an end position, and a speed |
| Road congestion predetermining service | Real-time position, an end position, a direction, and a speed |

It should be noted that the foregoing Table 1 is used as an example to describe each traffic service and status information corresponding to each traffic service, but not a limitation. First, the traffic services are not limited to the foregoing three services. Then, the status information corresponding to each traffic service is not limited to the content listed in the foregoing Table 1, either. A traffic service presented in the foregoing Table 1 and corresponding status information may be basic status information corresponding to the traffic service. The anti-collision service is used as an example for description. Basic status information corresponding to the anti-collision service is information about load, a direction, a speed, and braking, and non-basic status information may further include a distance, a type, and the like. The non-basic status information such as the distance and the type can improve accuracy of the anti-collision service.

Figure 2:
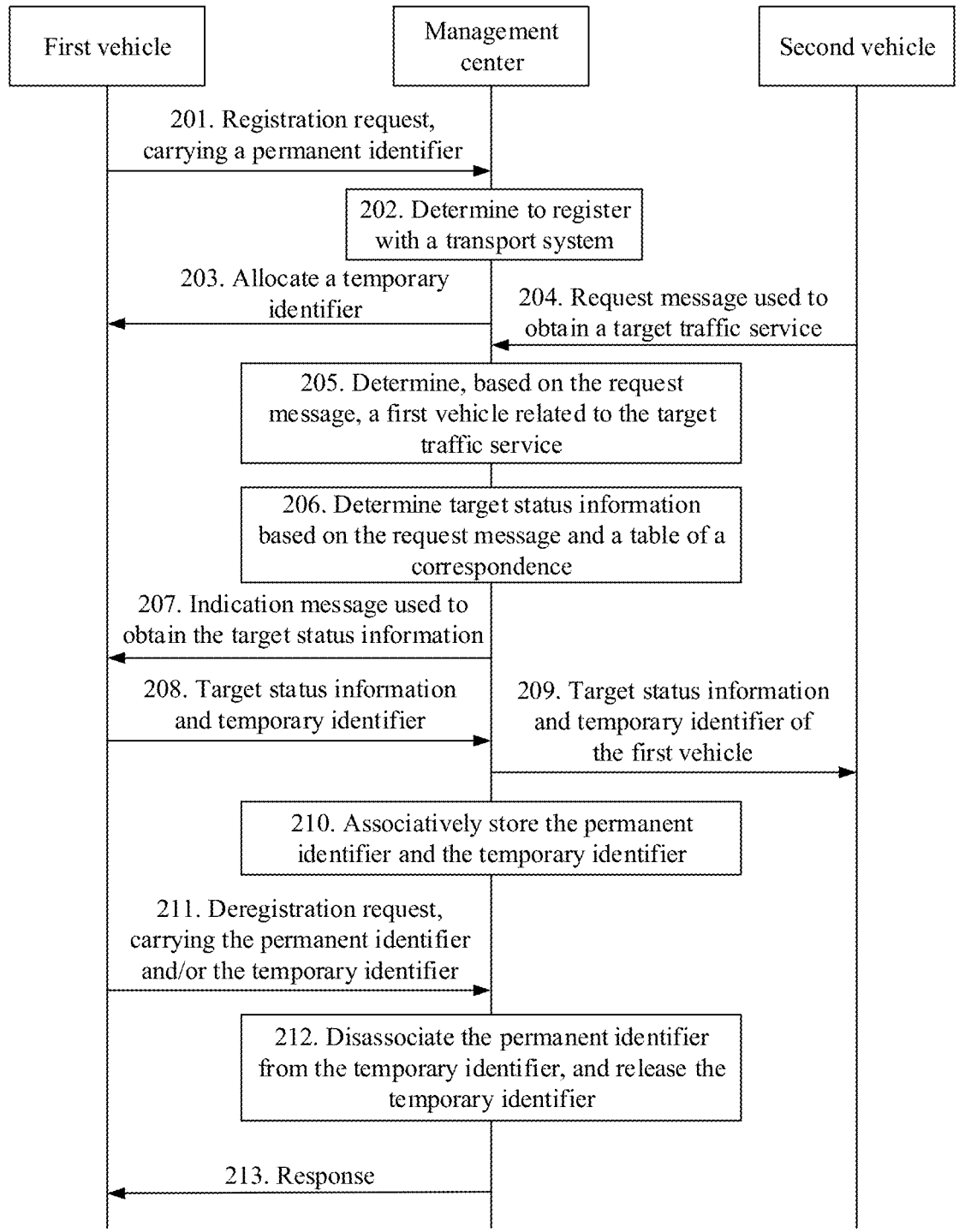
FIG. 2 is a schematic diagram of an embodiment of a traffic service obtaining method according to an embodiment of the present invention.

For ease of understanding, the following describes in detail the embodiments of the present invention. An embodiment of the present invention provides a traffic service obtaining method. The method is applied to a transport system. The transport system includes a management center, a first vehicle, and a second vehicle. The management center stores a table of a correspondence between a traffic service and status information, as shown in Table 1. Referring to FIG. 2, an embodiment of the method includes the following steps.

Step 201: The first vehicle sends a registration request to the management center.

When the first vehicle enters coverage of the transport system, the first vehicle sends, to the management center, the registration request for registering to the transport system. Optionally, the registration request may carry a permanent identifier of the first vehicle.

It may be understood that the permanent identifier is a permanent identifier that has been marked by a manufacturer for the vehicle at delivery of the vehicle. The permanent identifier keeps unchanged in a life cycle of the vehicle and is a unique identifier globally. To be specific, the permanent identifier represents only the vehicle globally. The permanent identifier may be marked by using a plurality of methods, for example, may be marked by using information such as country-region-delivery date-manufacturer-lot number-random code. A form of the permanent identifier herein is merely an example for description, and a specific marking method is not limited, provided that the vehicle can be uniquely marked.

For example, the permanent identifier may be associatively stored in a service platform as static status information of the vehicle at delivery, and related static status information of the vehicle may be found based on the permanent identifier by using the service platform.

Step 202: The management center receives the registration request sent by the first vehicle, and determines, based on a permanent identifier carried in the registration request, to allow the vehicle to be registered with the ITS.

When the management center receives the registration request from the first vehicle, the management center may query the static status information of the vehicle from the service platform by using the permanent identifier. For example, the management center may determine, based on a production date of the vehicle, whether the vehicle is a vehicle whose service life expires, or determine, based on type information of the vehicle, whether the vehicle is allowed to enter road coverage of the ITS. If information stored in the service platform is inadequate or out-of-date, the management center of the vehicle needs to query the static status information of the vehicle from another functional entity (such as a vehicle manufacturer or a vehicle testing organization) and then performs corresponding processing. For example, a large-sized container truck is not allowed to enter some roads for traveling. If the management center detects that a type, a swept volume, and a service life of the vehicle meet a preset criterion for entering the ITS, in other words, if the vehicle is a legal vehicle, the management center determines to allow the vehicle to be registered with the ITS. If the vehicle cannot meet the preset criterion, in other words, if the vehicle is an illegal vehicle, the management center sends prompt information to the vehicle, does not allow the vehicle to enter geographical coverage of the ITS, and reports related information of the vehicle to a traffic management department.

In this embodiment of the present invention, whether a vehicle is a legal vehicle is determined by using a permanent identifier carried in the registration request; and only when it is determined that the vehicle is the legal vehicle, the vehicle is allowed to enter the ITS; or when it is determined that the vehicle is an illegal vehicle, information about the vehicle is reported to the traffic management department. This effectively reduces a potential road traffic hazard and improves vehicle traveling safety. An illegal vehicle is monitored, effectively reducing an accident occurrence possibility of the illegal vehicle on a road.

Step 203: The management center allocates a temporary identifier to the first vehicle that is registered with the ITS.

The temporary identifier is used to differentiate the vehicle in the ITS, and the temporary identifier is used to represent the vehicle in exchanging information with the information management center or represent the vehicle in exchanging information with another vehicle. The temporary identifier may be allocated by the information management center during unified planning and allocation performed on vehicles in the ITS.

Step 204: The second vehicle sends, to the management center, a request message used to obtain a target traffic service.

The target traffic service is an anti-collision service, a path planning service, a road congestion predetermining service, or the like. It should be noted that, in this embodiment of the present invention, when the second vehicle is registered with the transport system, the management center also allocates a temporary identifier to the second vehicle. Therefore, in this step, the second vehicle is a vehicle that has been already registered with the transport system.

Step 205: The management center receives the request message sent by the second vehicle, and the management center determines, based on the request message, a temporary identifier related to the target traffic service and a first vehicle corresponding to the temporary identifier.

After receiving the request message sent by the second vehicle, the management center may determine, based on the request message, the target traffic service requested by the second vehicle. That the target traffic service is the anti-collision service may be used as an example for description. After the management center determines that the target traffic service is the anti-collision service, the management center determines, based on basic traffic information that is learned in real time, a temporary identifier related to the anti-collision service. The temporary identifier is used to indicate a first vehicle in a preset range centered by the second vehicle.

Step 206: The management center determines, based on the request message and a table of a correspondence, target status information required for the target traffic service.

For example, the management center determines, based on the request message, that the target traffic service is the anti-collision service, and the management center searches the stored table of a correspondence between a traffic service and status information (as shown in Table 1), to obtain that status information corresponding to the anti-collision service is information about load, a direction, a speed, and braking.

The management center determines, based on the request message, that the target traffic service is the path planning service, and the management center searches the stored table of a correspondence between a traffic service and status information (as shown in Table 1), to obtain that status information corresponding to the path planning service is a real-time position, a starting position, an end position, and a speed.

The management center determines, based on the request message, that the target traffic service is the road congestion predetermining service, and the management center searches the stored table of a correspondence between a traffic service and status information (as shown in Table 1), to obtain that status information corresponding to the road congestion predetermining service is a real-time position, an end position, a direction, and a speed.

It should be noted that a specific time sequence of step 205 and step 206 is not limited.

Step 207: The management center sends, to the first vehicle, an indication message used to obtain the target status information.

The first vehicles are a plurality of vehicles related to the target traffic service. For example, when the target traffic service is the anti-collision service, the management center sends the indication message to the first vehicles in the preset range surrounding the second vehicle. The indication message is an indication message used to instruct to obtain information about a starting position, a real-time position, an end position, and a speed. Optionally, real-time position information of a vehicle may be used as basic status information, and is information that needs to be sent to the transport system in real time after the vehicle is registered with the transport system, so that the management center learns a traffic status in the transport system in real time. Therefore, the indication message may not indicate a real-time position.

Step 208: After receiving the indication message, the first vehicle sends the target status information to the management center, where the target status information carries the temporary identifier of the first vehicle.

After the first vehicle receives the indication message, because the indication message specifically indicates required status information, the first vehicle needs to send only the status information indicated by the indication message, rather than send all information related to the first vehicle to the management center purposelessly. This prevents leakage of other private information (such as driver information and historical traveling data). The target status information carries a temporary identifier, and the temporary identifier is used to identify a specific vehicle that sends the target status information.

Step 209: The management center receives the target status information sent by the first vehicle, and sends the target status information to the second vehicle.

Figure 3:
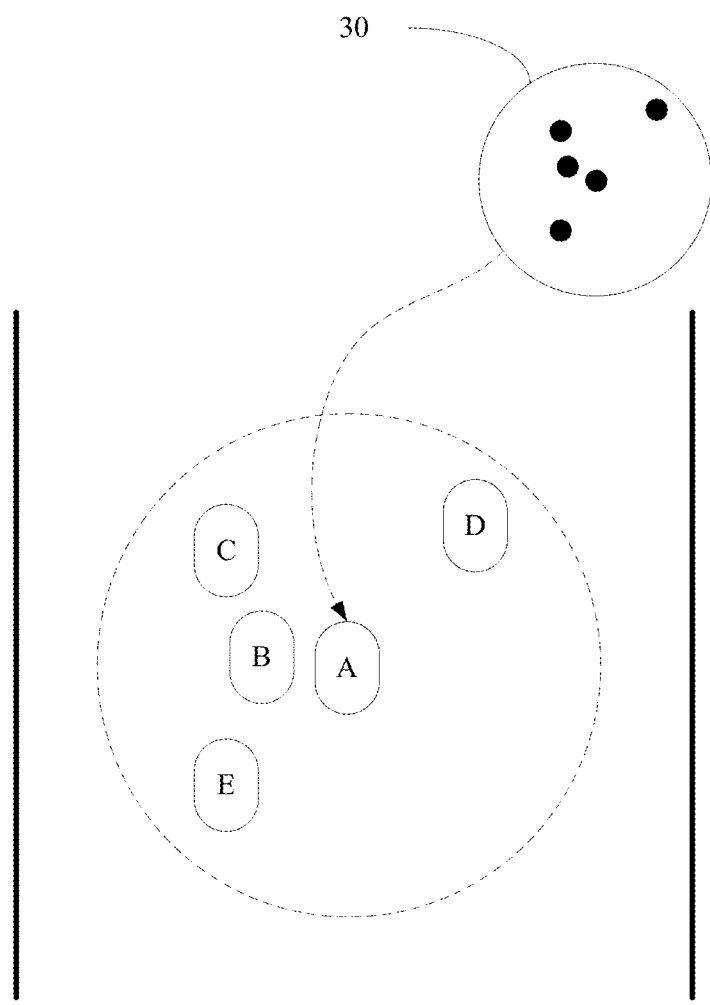
FIG. 3 is a schematic diagram of an anti-collision service scenario according to an embodiment of the present invention.

The target status information is used to provide the second vehicle with a traffic service. For example, the second vehicle needs to request the anti-collision service. When the second vehicle receives the target status information, sent by the management center, of the first vehicle, the second vehicle may obtain a dynamic real-time view based on status information of the second vehicle and status information of the first vehicle. Specifically, refer to a schematic diagram of a scenario shown in FIG. 3 for understanding. After the management center receives the request message that is sent by the first vehicle and that is used to request the anti-collision service, because in the anti-collision service, a dynamic real-time view 30 centered by a vehicle A is generated based on the status information and the temporary identifier of the second vehicle (such as the vehicle A) and the status information and the temporary identifier of the first vehicle (such as a vehicle B, a vehicle C, or a vehicle D) in the preset range surrounding the second vehicle, the temporary identifier is used to identify the vehicle in the dynamic real-time view 30. The second vehicle avoids collision with another vehicle based on the dynamic real-time view and information such as load, a direction, and a speed of the first vehicle.

For example, if the target traffic service is the road congestion predetermining service, the second vehicle may calculate a possible traveling path of the first vehicle based on a starting position and an end position of the first vehicle, and the second vehicle determines, based on a real-time position and a speed of the first vehicle, a probability that the first vehicle arrives at a critical road segment, and may further determine a probability that vehicle congestion may occur on the critical road segment in a time period.

If the target traffic service is the path planning service, first, the second vehicle determines several optional paths, for example, four optional paths, based on a starting position and an end position of the second vehicle; then, the second vehicle determines, based on a received end position and direction of the first vehicle, probabilities that the first vehicle may pass through the four paths, and determines, based on a speed and a real-time position of the first vehicle, a time period in which the first vehicle travels on a path; and finally, the second vehicle determines an optimal path (no congestion and fewest vehicles).

In the example of the path planning traffic service, after obtaining path planning information, the second vehicle travels on a path provided in the path planning information, and the second vehicle may send actual traveling path information to the management center. The temporary identifier of the second vehicle and the actual traveling path information of the second vehicle may be associatively stored by the management center, and associatively stored data is used as historical traveling path data of a vehicle to which the second vehicle belongs.

In this embodiment of the present invention, traveling path planning and an actual traveling path of each vehicle are information mandatory for real-time traffic scheduling during traffic management. Therefore, relatively accurate data can be provided for the ITS.

It should be noted that the foregoing several cases are examples for description rather than limitations. During actual application, a specific implementation is not limited in the present invention.

Step 210: The management center associatively stores the permanent identifier, the temporary identifier, and status information corresponding to the temporary identifier.

The permanent identifier is associated with a temporary identifier that is allocated to the first vehicle in a time period. The management center maintains association information between the permanent identifier and the temporary identifier in a unified manner.

Optionally, the management center may send an audit request to the first vehicle at any time, to query the permanent identifier and/or the temporary identifier of the first vehicle. Then, the first vehicle returns a corresponding audit response and submits the permanent identifier and/or the temporary identifier. In this way, an association between the permanent identifier and the temporary identifier is synchronized between the vehicle and the management center, to reduce a probability that the permanent identifier is not associated with the temporary identifier, and ensure accuracy of the corresponding association information between the permanent identifier and the temporary identifier.

Optionally, the transport system further includes a querying device. The querying device has a query permission. If it is necessary to know all traveling paths of a vehicle in a time period, for example, if a judicial branch needs to track a route of a vehicle carrying dangerous goods, the querying device may send a request to the ITS, to apply for querying a temporary identifier sequence of the vehicle in the time period. After determining that the querying device has a right to make the query, the management center extracts, based on a permanent identifier of the vehicle, a sequence of temporary identifiers associatively stored with the permanent identifier, or extracts status information of the sequence or related traffic data of the sequence. A related judicial department can obtain, through splicing based on the associated traffic data, information such as the traveling paths of the vehicle in the time period.

In this embodiment of the present invention, in different ITSs, different temporary identifiers may be allocated to a same vehicle. Historical traffic data of the vehicle may be found by associatively storing a unique permanent identifier and the temporary identifiers. However, not all departments or persons can query the historical data. A department having a right can find the historical data. Therefore, accurate and effective evidence may be provided for the judicial branch in some special cases.

It should be noted that step 210 is an optional step and may be not performed; and step 210 may be any step between step 204 and step 209, and a specific time sequence is not limited.

Step 211: The first vehicle sends a deregistration request to the management center.

The deregistration request carries the permanent identifier and/or the temporary identifier.

Step 212: The management center receives the deregistration request, and feeds back a response to the first vehicle.

The response indicates whether deregistration is successful. When deregistration is successful, the management center disassociates the temporary identifier from the first vehicle based on the temporary identifier in the deregistration request, and the management center disassociates the temporary identifier from the permanent identifier.

It should be noted that step 211 and step 212 are optional steps and may be not performed.

In this embodiment of the present invention, the management center allocates the temporary identifier to the vehicle that is registered with the transport system. When the second vehicle requires the target traffic service, the second vehicle sends the request message to the management center; the management center determines, based on the stored table of a correspondence between a traffic service and status information, the target status information corresponding to the target traffic service, and obtains the target status information from the first vehicle (a status information provider); the first vehicle sends the target status information to the management center; and the management center sends, to the second vehicle, the target status information sent by the first vehicle. The first vehicle provides the target status information based on the specific target traffic service. The target status information carries the temporary identifier of the first vehicle. When being used to perform a function of identifying the vehicle, the temporary identifier is not associated with other private information (such as driver information or historical data information) of the first vehicle. This effectively prevents leakage of private information of the first vehicle (the information provider), and improves information security.

Figure 4:
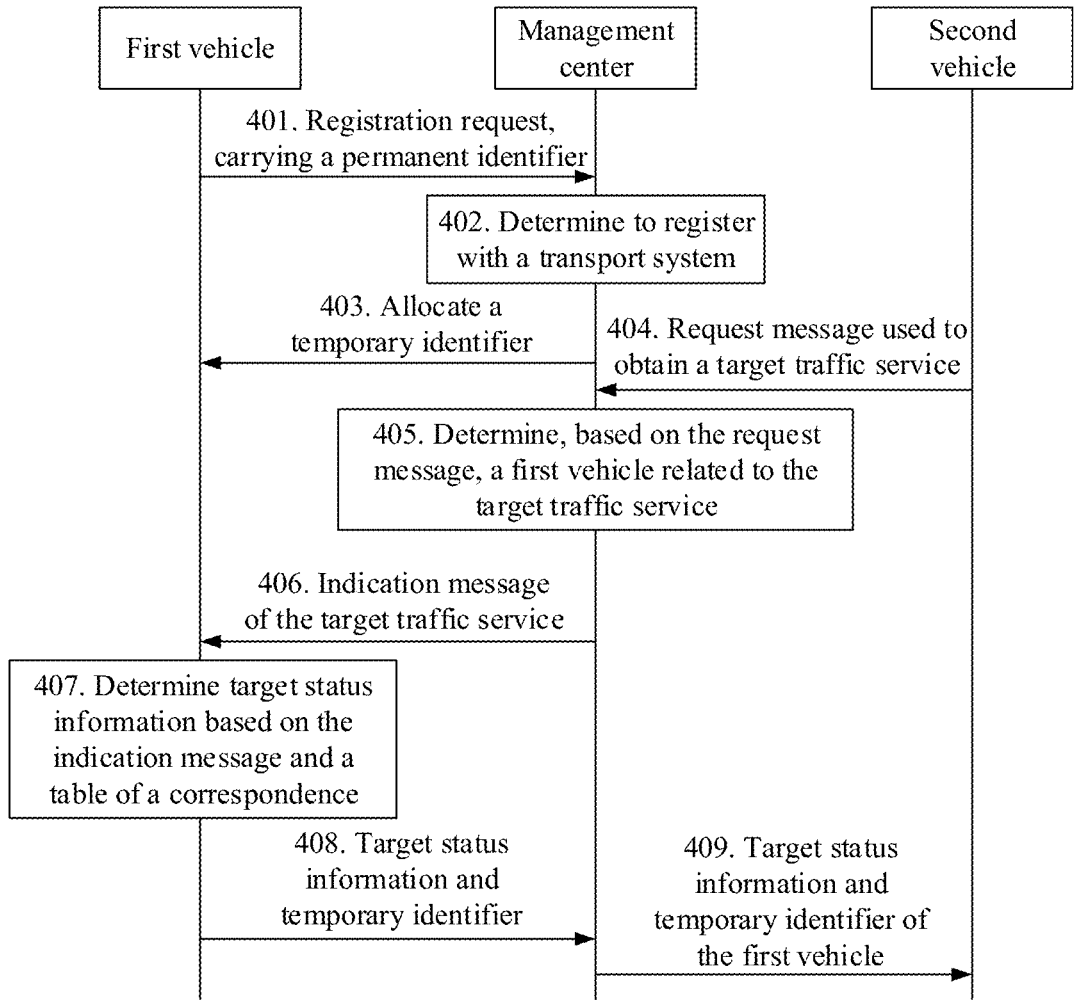
FIG. 4 is a schematic diagram of another embodiment of a traffic service obtaining method according to an embodiment of the present invention.

In the embodiment corresponding to FIG. 2, the management center stores the table of a correspondence between a traffic service and status information. Referring to FIG. 4, the present invention provides another embodiment of a traffic service obtaining method below. In this embodiment, a vehicle stores a table of a correspondence between a traffic service and status information. Vehicles include a first vehicle and a second vehicle.

Step 401 to step 405 are the same as step 201 to step 205 in the embodiment corresponding to FIG. 2. Details are not described herein again.

Step 406: The management center sends an indication message of the target traffic service to the first vehicle based on the request message.

The management center determines, based on the request message, the traffic service that needs to be obtained by the second vehicle. Then, the management center sends the indication message to the first vehicle related to the target traffic service. The indication message is used to indicate the target traffic service.

For example, the target traffic service may be an anti-collision service, a path planning service, a road congestion predetermining service, or the like.

Step 407: The first vehicle receives the indication message, and determines target status information based on the indication message and a table of a correspondence.

The first vehicle receives the indication message, determines the target traffic service based on the indication message, and searches the stored table of a correspondence (as shown in Table 1) based on the target traffic service, to determine the target status information corresponding to the target traffic service.

Step 408: The first vehicle sends the target status information to the management center.

The first vehicle sends the target status information to the management center. The target status information carries the temporary identifier of the first vehicle. The temporary identifier is used to identify a vehicle to which the target status information belongs.

Step 409 is the same as step 209 in the embodiment corresponding to FIG. 2. Details are not described herein again.

In this embodiment of the present invention, the management center allocates the temporary identifier to the vehicle that is registered with the transport system. When the second vehicle requires the target traffic service, the second vehicle sends the request message to the management center; the management center sends the indication message of the target traffic service to the first vehicle (a status information provider); and the first vehicle determines, based on the indication message and the stored table of a correspondence between a traffic service and status information, the target status information that needs to be provided. The target status information carries the temporary identifier of the first vehicle. When being used to perform a function of identifying the vehicle, the temporary identifier is not associated with other private information (such as driver information or historical data information) of the first vehicle. This effectively prevents leakage of private information of the first vehicle (the information provider), and improves information security.

Optionally, in the foregoing embodiment, the second vehicle obtains, by using the management center, the target status information, corresponding to the target traffic service, of the first vehicle. An embodiment of the present invention further provides another possible implementation of a traffic service obtaining method. During actual application, a second vehicle may directly obtain, from a first vehicle, target status information corresponding to a target traffic service. Specifically, when the first vehicle is registered with the transport system, a management center allocates a temporary identifier to the first vehicle, and the second vehicle sends, to the first vehicle, a request message used to obtain the target traffic service. The first vehicle stores a table of a correspondence between a traffic service and status information, and the first vehicle may determine, based on the request message and the table of a correspondence, the target status information corresponding to the target traffic service, where the target status information carries the temporary identifier of the first vehicle. The first vehicle sends the target status information to the second vehicle.

A vehicle is used as an example for description in the foregoing embodiment. During actual application, the solution in the foregoing embodiment may also be promoted and applied to a pedestrian or a cyclist. A mobile terminal or a wearable device carried by the pedestrian exchanges information with the management center. A permanent identifier is identity card information of a user, and a temporary identifier is also planned and allocated by an ITS in a unified manner based on vehicles and pedestrians in the ITS. A specific implementation is understood in combination with the embodiment corresponding to FIG. 2. Details are not described herein again.

In an application scenario in which the solution is applied to a pedestrian, a user may request the foregoing anti-collision service. A management center in an ITS sends anti-collision service information to a wearable device of the user, and the wearable device may instruct, through voice broadcast, the user to pay attention to traffic safety, to reduce a potential safety hazard.

Figure 5:
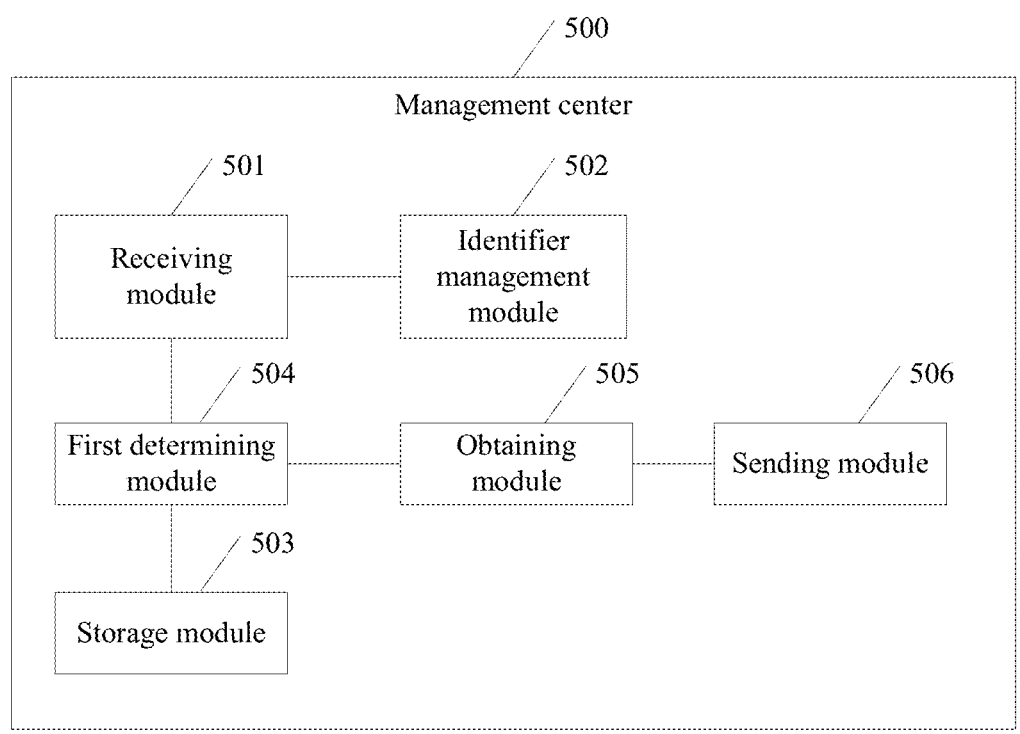
FIG. 5 is a schematic structural diagram of an embodiment of a management center according to an embodiment of the present invention.

The foregoing specifically describes the traffic service obtaining method in the embodiments of the present invention. The following specifically describes a management center to which the method is applied. Referring to FIG. 5, an embodiment of a management center provided in an embodiment of the present invention includes a receiving module 501, an identifier management module 502, a storage module 503, a first determining module 504, an obtaining module 505, and a sending module 506.

The receiving module 501 is configured to receive a registration request sent by a first vehicle.

The identifier management module 502 is configured to allocate a temporary identifier to the first vehicle based on the registration request received by the receiving module 501, where the temporary identifier is used to identify the first vehicle in coverage of a transport system.

The receiving module 501 is further configured to receive a request message that is sent by a second vehicle and that is used to request a target traffic service.

The storage module 503 is configured to store a table of a correspondence between a traffic service and status information.

The first determining module 504 is configured to: determine, based on the request message received by the receiving module 501, a temporary identifier related to the target traffic service, where the temporary identifier is used to indicate a first vehicle corresponding to the temporary identifier; and determine, based on the table of a correspondence, target status information required for the target traffic service.

The obtaining module 505 is configured to obtain the target status information from the first vehicle determined by the first determining module 504, where the target status information carries the temporary identifier of the first vehicle.

The sending module 506 is configured to send the target status information to the second vehicle, where the target status information is used to provide the second vehicle with the target traffic service.

Figure 6:
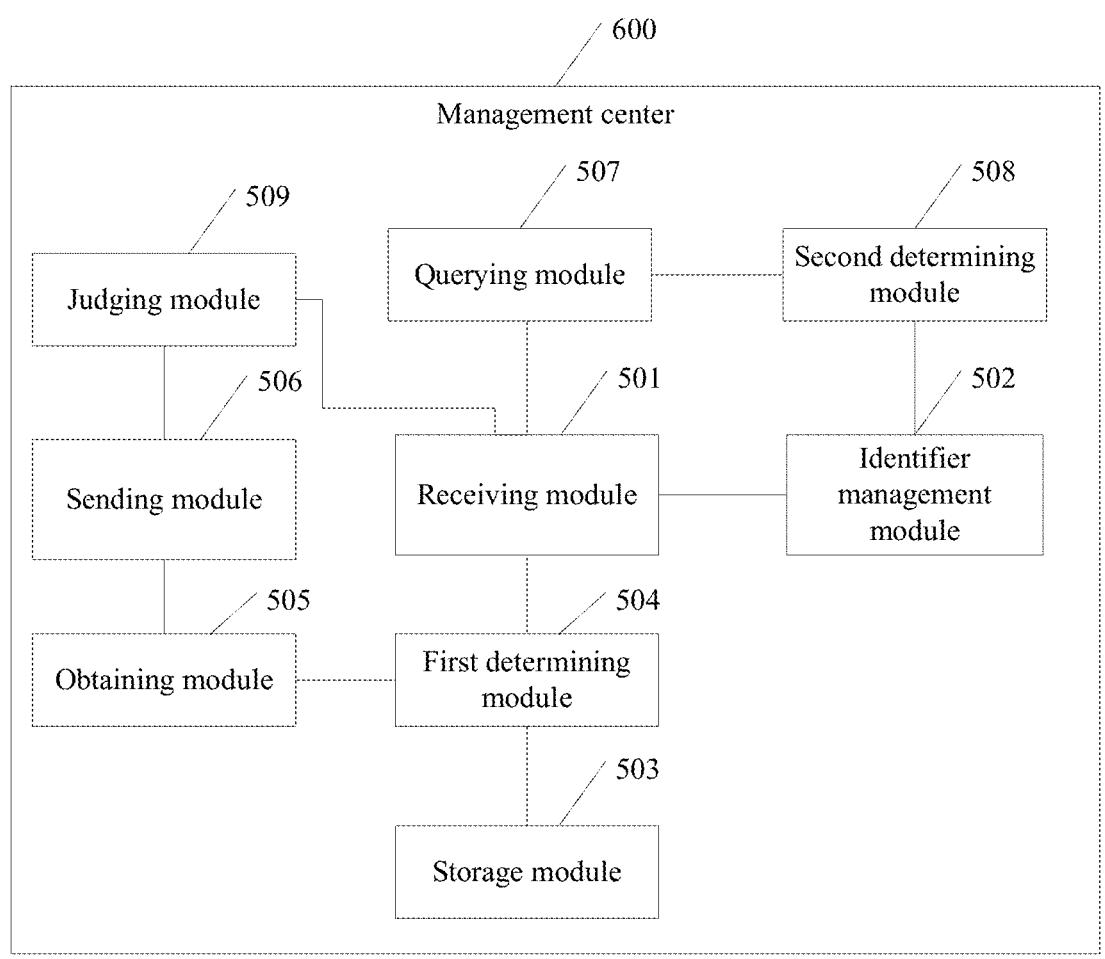
FIG. 6 is a schematic structural diagram of another embodiment of a management center according to an embodiment of the present invention.

Optionally, on a basis of the embodiment corresponding to FIG. 5, referring to FIG. 6, another embodiment of a management center provided in an embodiment of the present invention includes the following.

The registration request carries a permanent identifier, where the permanent identifier is a unique identifier that keeps unchanged in a life cycle of the first vehicle. The management center further includes a querying module 507 and a second determining module 508.

The querying module 507 is configured to query status information of the first vehicle based on the permanent identifier received by the receiving module 501.

The second determining module 508 is configured to: when the status information of the first vehicle meets a preset criterion, determine to allow the first vehicle to be registered with the transport system.

Optionally, the transport system further includes a querying device. The management center further includes a storage module 503 and a judging module 509.

The storage module 503 is configured to associatively store the permanent identifier, the temporary identifier, and status information associated with the temporary identifier.

The receiving module 501 is further configured to receive a query request from the querying device, where the query request carries the permanent identifier and/or the temporary identifier.

The judging module 509 is configured to determine whether the querying device has a query permission.

The sending module 506 is configured to: when the judging module 509 determines that the querying device has the query permission, provide the querying device with the status information associated with the temporary identifier.

Optionally, the receiving module 501 is further configured to receive a deregistration request sent by the first vehicle, where the deregistration request carries the temporary identifier and/or the permanent identifier.

The identifier management module 502 is further configured to: disassociate the permanent identifier from the temporary identifier based on the temporary identifier and/or the permanent identifier, and release the temporary identifier.

It may be clearly understood by a person skilled in the art that, for the purpose of convenient and brief description, for detailed working processes of the foregoing modules, refer to corresponding processes in the foregoing method embodiment corresponding to FIG. 2, and details are not described herein again.

Figure 7:
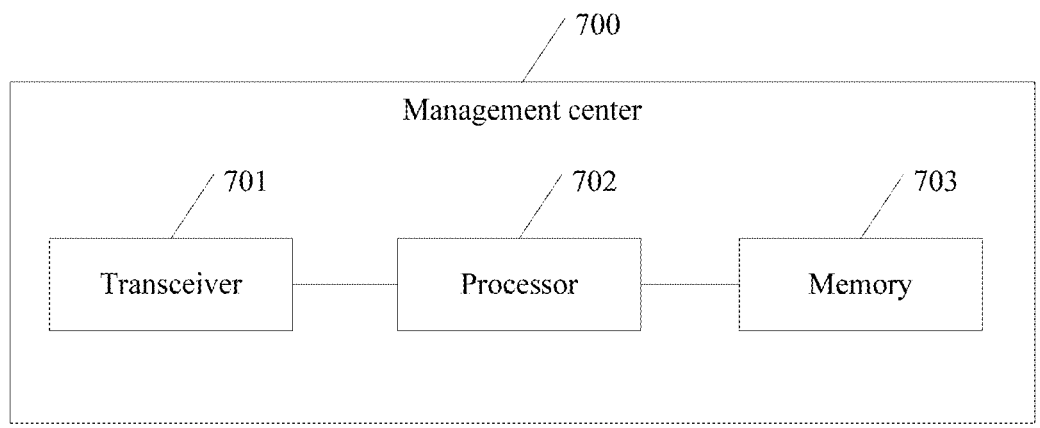
FIG. 7 is a schematic structural diagram of another embodiment of a management center according to an embodiment of the present invention.

Further, the apparatuses in FIG. 5 and FIG. 6 are presented in a form of a functional module. The "modules" herein may be an application-specific integrated circuit (application-specific integrated circuit, ASIC), a circuit, a processor executing one or more software or firmware programs and a memory, an integrated logic circuit, and/or another device that can provide the foregoing functions. In a simple embodiment, the modules may be implemented by using a transceiver 701, a processor 702, and a memory 703 in FIG. 7.

The memory 703 is configured to store a table of a correspondence between a traffic service and status information, and is further configured to store computer-executable program code.

The processor 702 is coupled to the memory 703 and the transceiver 701.

The program code includes an instruction. When the processor 702 executes the instruction, a management center performs, based on the instruction, the method performed by the management center in the embodiment corresponding to FIG. 2.

Figure 8:
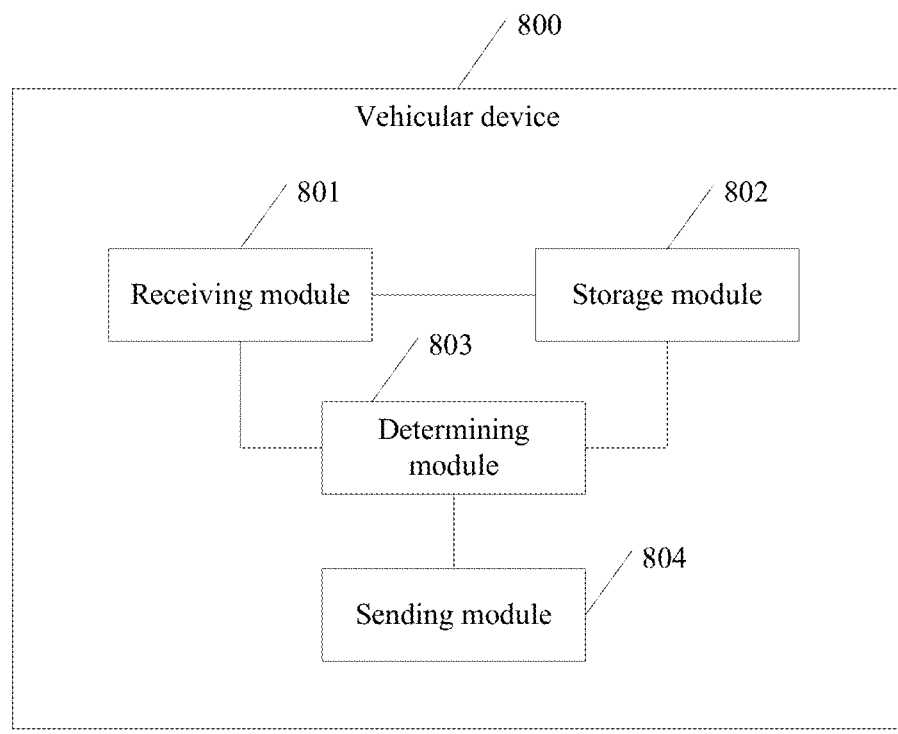
FIG. 8 is a schematic structural diagram of an embodiment of a vehicular device according to an embodiment of the present invention.

An embodiment of the present invention further provides a vehicular device. The vehicular device belongs to a vehicle, and the vehicle belongs to a transport system. Referring to FIG. 8, an embodiment of the vehicular device provided in this embodiment of the present invention includes a receiving module 801, a storage module 802, a determining module 803, and a sending module 804.

The receiving module 801 is configured to: when the vehicle is registered with the transport system, receive a temporary identifier sent by a management center, where the temporary identifier is used to identify the vehicle in coverage of the transport system.

The receiving module 801 is further configured to receive an indication message, sent by the management center, of a target traffic service.

The storage module 802 is configured to store a table of a correspondence between a traffic service and status information, and is further configured to store the temporary identifier that is allocated by the management center and that is received by the receiving module.

The determining module 803 is configured to determine, based on the indication message received by the receiving module 801 and the table of a correspondence stored by the storage module 802, target status information corresponding to the target traffic service.

The sending module 804 is configured to send, to the management center, the target status information determined by the determining module 803, where the target status information carries the temporary identifier, and the target status information is used to provide a target vehicle with the target traffic service.

Optionally, the sending module 804 is further configured to send a registration request to the management center. The registration request carries a permanent identifier. The permanent identifier is a unique identifier that keeps unchanged in a life cycle of a vehicle, and the permanent identifier is used to instruct the management center to query status information of the vehicle and determine, based on the status information of the vehicle, to allocate the temporary identifier to the vehicle.

It may be clearly understood by a person skilled in the art that, for the purpose of convenient and brief description, for detailed working processes of the foregoing modules, refer to corresponding processes in the foregoing method embodiment corresponding to FIG. 4, and details are not described herein again.

Further, the apparatus in FIG. 8 is presented in a form of a functional module. The "modules" herein may be an application-specific integrated circuit (application-specific integrated circuit, ASIC), a circuit, a processor executing one or more software or firmware programs and a memory, an integrated logic circuit, and/or another device that can provide the foregoing functions. In a simple embodiment, the modules may be implemented by using an output/input device, a transceiver, a processor, and a memory in FIG. 9.

Figure 9:
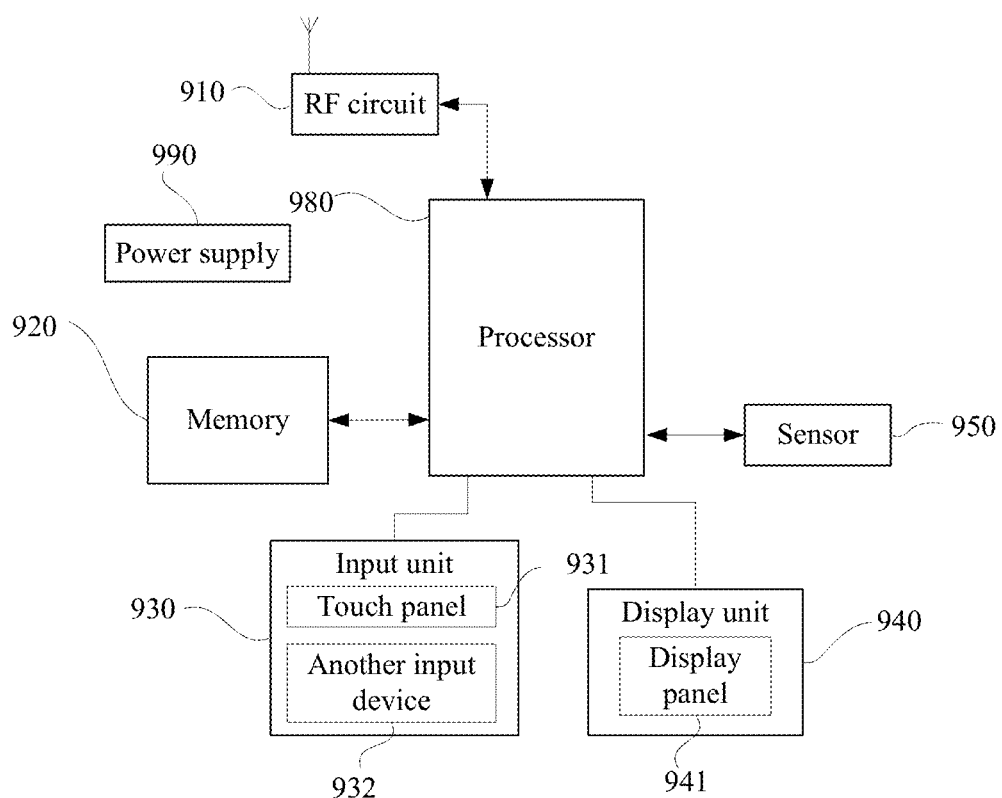
FIG. 9 is a schematic structural diagram of another embodiment of a vehicular device according to an embodiment of the present invention.

As shown in FIG. 9, for ease of description, only components related to this embodiment of the present invention are shown. For technical details that are not disclosed, refer to the method embodiments of the present invention.

FIG. 9 is a partial structural block diagram of a vehicular device related to a terminal provided in this embodiment of the present invention. Referring to FIG. 9, the vehicular device includes components such as a radio frequency (Radio Frequency, RF) circuit 910, a memory 920, an input unit 930, a display unit 940, a sensor 950, a processor 980, and a power supply 990. A person skilled in the art may understand that a structure of the vehicular device shown in FIG. 9 constitutes no limitation to the vehicular device, and the vehicular device may include components more or fewer than those shown in the figure, or combine some components, or have a different component arrangement.

The following specifically describes the constituent components of the vehicular device with reference to FIG. 9.

The RF circuit 910 may be configured to: receive and send signals in information receiving and sending processes, and particularly send received status information to the processor 980 for processing. Usually, the RF circuit 910 includes but is not limited to an antenna, at least one amplifier, a transceiver, a coupler, a low noise amplifier (Low Noise Amplifier, LNA), a duplexer, and the like.

The memory 920 may be configured to store a table of a correspondence between a traffic service and status information, and a software program and module. The processor 980 runs the software program and module that are stored in the memory 920, to execute various functional applications of the vehicular device and perform data processing of the vehicular device. In addition, the memory 920 may include a high-speed random access memory, or may include a non-volatile memory such as at least one magnetic disk storage device, a flash memory device, or another volatile solid-state storage device.

The input unit 930 may be configured to: receive entered digit or character information, and generate key signal input related to user setting and function control of the vehicular device. Specifically, the input unit 930 may include a touch panel 931 and another input device 932. The touch panel 931 is also referred to as a touchscreen, and may collect a touch operation performed by a user on or near the touch panel 931 (for example, an operation performed by the user on or near the touch panel 931 by using a finger or any proper object or accessory such as a stylus), and drive a corresponding connection apparatus based on a preset program. Optionally, in addition to the touch panel 931, the input unit 930 may include the another input device 932. Specifically, the another input device 932 may be a volume control button, a switch button, or the like.

The display unit 940 may be configured to display information entered by the user or information provided for the user, and various menus of the vehicular device. The display unit 940 may include a display panel 941. Optionally, the display panel 941 may be configured in a form such as a liquid crystal display (Liquid Crystal Display, LCD) or an organic light-emitting diode (Organic Light-Emitting Diode, OLED). Further, the touch panel 931 may cover the display panel 941. After detecting a touch operation on or near the touch panel 931, the touch panel 931 transfers the touch operation to the processor 980 to determine a touch event type. Subsequently, the processor 980 provides corresponding visual output on the display panel 941 based on the touch event type. In FIG. 9, although the touch panel 931 and the display panel 941 are used as two independent components to implement input and output functions of the vehicular device, in some embodiments, the touch panel 931 and the display panel 941 may be integrated to implement the input and output functions of the vehicular device.

The vehicular device may further include at least one sensor 950 such as a sensing counter, a gyroscope, a barometer, a hygrometer, a thermometer, an infrared sensor, or another sensor. Details are not described herein.

The processor 980 is a control center of the vehicular device, and is connected to components of the entire vehicular device by using various interfaces and lines. The processor 980 runs or executes the software program and/or module stored in the memory 920 and invokes data stored in the memory 920, to perform various functions and data processing of the vehicular device, so as to perform overall monitoring on the vehicular device. Optionally, the processor 980 may include one or more processing units. Preferably, an application processor and a modem processor may be integrated into the processor 980. The application processor mainly processes an operating system, a user interface, an application program, and the like. The modem processor mainly processes wireless communication. It may be understood that the modem processor may not be integrated into the processor 980.

The vehicular device further includes the power supply 990 (such as a battery) that supplies power to all components. Preferably, the power supply may be logically connected to the processor 980 by using a power supply management system, to implement functions such as charging and discharging management and power consumption management by using the power supply management system.

In this embodiment of the present invention, the processor 980 enables, based on program code stored in the memory, the vehicular device to perform the method performed by the first vehicle in the embodiment corresponding to FIG. 4.

It may be clearly understood by a person skilled in the art that, for the purpose of convenient and brief description, for detailed working processes of the foregoing system, apparatus, and unit, refer to corresponding processes in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A method of obtaining traffic service, wherein the method is applied to a transport system including a management center, a first vehicle, and a second vehicle, wherein the management center stores a correspondence between a traffic service and status information, and wherein the method comprises:
   receiving, by the management center from the first vehicle, a registration request carrying a permanent identifier of the first vehicle;
   querying, by the management center, a second status information of the first vehicle based on the permanent identifier, wherein the second status information comprises a type, a swept volume, and a service life of the first vehicle;
   determining, by the management center, to allow the first vehicle to be registered with the transport system when the second status information of the first vehicle meets a preset criterion;
   allocating, by the management center to the first vehicle, a first temporary identifier based on the second status information, wherein the first temporary identifier identifies the first vehicle in coverage of the transport system;
   receiving, by the management center from the second vehicle, a request message requesting a target traffic service;
   determining, by the management center based on the request message, a second temporary identifier, for the second vehicle, indicating the first vehicle related to the target traffic service;
   determining, based on the request message and the stored correspondence, target status information required for the target traffic service;
   obtaining, by the management center from the first vehicle, the target status information carrying the first temporary identifier; and
   sending, by the management center to the second vehicle, the target status information of the target traffic service.

2. The method of claim 1, wherein the permanent identifier is a unique identifier that remains unchanged in a life cycle of the first vehicle.

3. The method of claim 1, wherein the transport system further comprises a querying device, and wherein after allocating, by the management center, the first temporary identifier to the first vehicle based on the registration request, the method further comprises:
   associatively storing, by the management center, the permanent identifier, the first temporary identifier, and the second status information associated with the first temporary identifier;
   receiving, by the management center from the querying device, a query request carrying the permanent identifier and/or the first temporary identifier;
   determining, by the management center, whether the querying device has a query permission; and
   when the management center determines that the querying device has the query permission, providing, by the management center, the querying device with the second status information associated with the first temporary identifier.

4. The method of claim 1, further comprising:
   receiving, by the management center from the first vehicle, a deregistration request carrying the first temporary identifier and/or the permanent identifier; and
   disassociating, by the management center, the permanent identifier from the first temporary identifier based on the first temporary identifier and/or the permanent identifier.

5. The method of claim 1, wherein the traffic service comprises an anti-collision service, a path planning service, or a road congestion predetermining service.

6. The method of claim 1, wherein the target traffic service is an anti-collision service, and wherein the stored correspondence comprises target status information, corresponding to the anti-collision service, comprising information about a direction, a speed, and braking of the first vehicle.

7. The method of claim 1, wherein the target traffic service comprises a path planning service, and wherein the stored correspondence comprises target status information, corresponding to the path planning service, comprising a real-time position, a starting position, an end position, and a speed of the first vehicle.

8. The method of claim 1, wherein the target traffic service comprises a road congestion predetermining service, and wherein the correspondence comprises target status information, corresponding to the road congestion predetermining service, comprising a real-time position, an end position, a direction, and a speed of the first vehicle.

9. A method of obtaining traffic service, wherein the method is applied to a transport system including a management center, a first vehicle, and a second vehicle, wherein the first vehicle stores a correspondence between a traffic service and status information, and wherein the method comprises:
   sending, by the first vehicle to the management center, a registration request carrying a permanent identifier that instructs the management center to query a second status information of the first vehicle, wherein the second status information comprises a type, a swept volume, and a service life of the first vehicle;
   determining, based on the second status information of the first vehicle, to allocate a temporary identifier to the first vehicle;
   when the first vehicle is registered with the transport system, receiving, by the first vehicle from the management center, the temporary identifier identifying the first vehicle in coverage of the transport system;
   receiving, by the first vehicle from the management center, an indication message of a target traffic service;
   determining, by the first vehicle based on the indication message and the stored correspondence, target status information corresponding to the target traffic service; and
   sending, by the first vehicle to the management center, the target status information carrying the temporary identifier of the first vehicle, wherein the target status information provides the second vehicle with the target traffic service.

10. The method of claim 9, wherein
   the permanent identifier is a unique identifier that remains unchanged in a life cycle of the first vehicle.

11. The method of claim 9, wherein the traffic service comprises an anti-collision service, a path planning service, or a road congestion predetermining service.

12. The method of claim 9, wherein the target traffic service is an anti-collision service, and wherein the stored correspondence comprises target status information, corresponding to the anti-collision service, comprising information about a direction, a speed, and braking of the first vehicle.

13. The method of claim 9, wherein the target traffic service comprises a path planning service, and wherein the stored correspondence comprises target status information, corresponding to the path planning service, comprising a real-time position, a starting position, an end position, and a speed of the first vehicle.

14. The method of claim 9, wherein the target traffic service comprises a road congestion predetermining service, and wherein the stored correspondence comprises target status information, corresponding to the road congestion predetermining service, comprising a real-time position, an end position, a direction, and a speed of the first vehicle.

15. A management center comprising:
a receiver configured to:
receive, from a first vehicle, a registration request carrying a permanent identifier; and
receive, from a second vehicle, a request message requesting a target traffic service;
a non-transitory computer-readable storage medium configured to store programming instructions and a correspondence between a traffic service and status information;
a processor coupled to the non-transitory computer-readable storage medium and the receiver, wherein the programming instructions instruct the processor to be configured to:
query a second status information of the first vehicle based on the permanent identifier, wherein the second status information comprises a type, a swept volume, and a service life of the first vehicle;
determine to allow the first vehicle to be registered with a transport system when the second status information meets a preset criterion;
allocate, to the first vehicle based on the second status information, a first temporary identifier identifying the first vehicle in coverage of the transport system;
determine, based on the request message, a second temporary identifier, for the second vehicle, indicating the first vehicle related to the target traffic service;
determine, based on the request message and the stored correspondence, target status information required for the target traffic service; and
obtain from the first vehicle the target status information carrying the first temporary identifier of the first vehicle; and
a transmitter coupled to the processor, and configured to send the target status information to the second vehicle, wherein the target status information provides the second vehicle with the target traffic service.

16. The management center of claim 15, wherein the permanent identifier is a unique identifier that remains unchanged in a life cycle of the first vehicle.

17. The management center of claim 15, wherein the management center further comprises a querying device, wherein the storage medium is further configured to associatively store the permanent identifier, the temporary identifier, and the second status information associated with the temporary identifier,
wherein the receiver is further configured to receive a query request from the querying device, wherein the query request carries the permanent identifier and/or the temporary identifier,
wherein the programming instructions further instruct the processor to be configured to determine whether the querying device has a query permission, and
wherein the transmitter is further configured to send the querying device with the second status information associated with the temporary identifier when the querying device has the query permission.

18. The management center of claim 15, wherein the receiver is further configured to receive from the first vehicle a deregistration request carrying the temporary identifier and/or the permanent identifier, and wherein the programming instructions further instruct the processor to be configured to disassociate the permanent identifier from the temporary identifier based on the temporary identifier and/or the permanent identifier.

19. A vehicular device, comprising:
a transmitter configured to send, to a management center, a registration request carrying a permanent identifier, wherein the permanent identifier is used to instruct the management center to query status information of a vehicle, wherein the status information comprises a type, a swept volume, and a service life of the vehicle;
a receiver configured to receive, from the management center based on the status information, a temporary identifier identifying the vehicle in coverage of a transport system and an indication message of a target traffic service, wherein the vehicle is registered with the transport system;
a storage medium configured to store a correspondence between a traffic service and the status information, and programming instructions; and
a processor coupled to the transmitter, the storage medium, and the receiver, wherein the programming instructions instruct the processor to be configured to determine, based on the indication message and the stored correspondence, target status information corresponding to the target traffic service,
wherein the transmitter is further configured to send, to the management center, the target status information carrying the temporary identifier, and
wherein the target status information provides a target vehicle with the target traffic service.

20. The vehicular device of claim 19, wherein the permanent identifier is a unique identifier that remains unchanged in a life cycle of the vehicle.

* * * * *